Patented Sept. 30, 1952

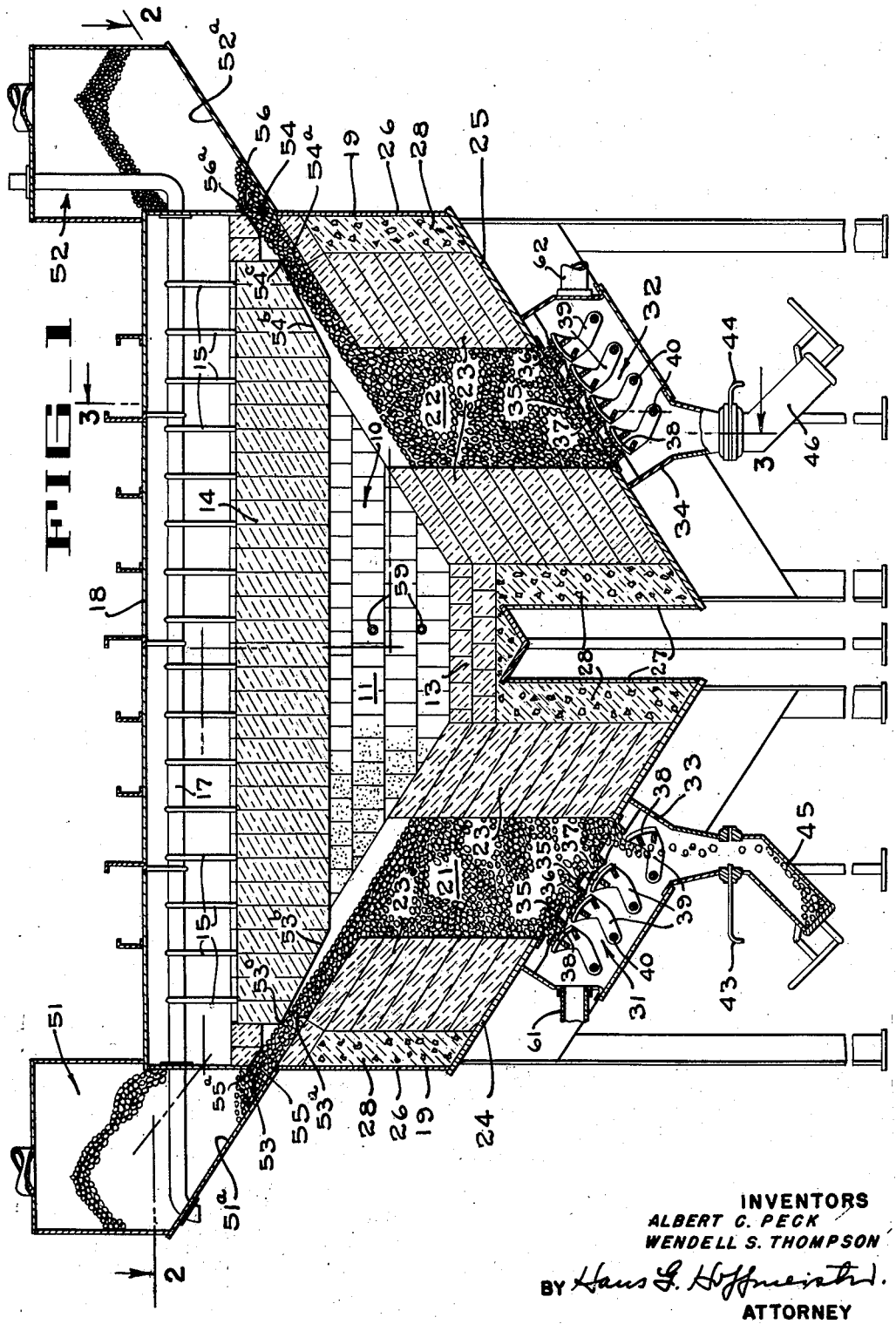
Sept. 30, 1952   A. C. PECK ET AL   2,612,364
REGENERATIVE FURNACE OF THE PEBBLE BED TYPE
Filed Jan. 28, 1949   5 Sheets-Sheet 1
INVENTORS
ALBERT C. PECK
WENDELL S. THOMPSON
BY Hans G. Hoffmeister
ATTORNEY Sept. 30, 1952     A. C. PECK ET AL     2,612,364
REGENERATIVE FURNACE OF THE PEBBLE BED TYPE
Filed Jan. 28, 1949                        5 Sheets—Sheet 2
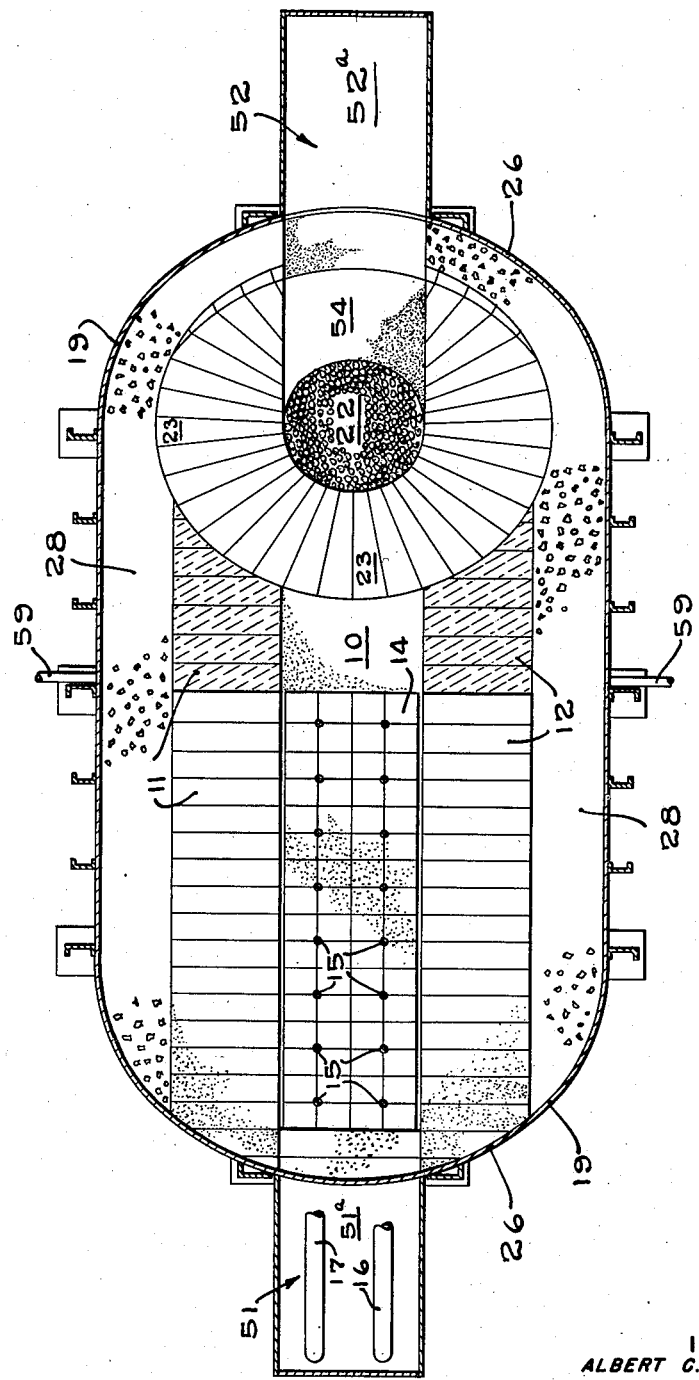
INVENTORS
ALBERT C. PECK
WENDELL S. THOMPSON
BY
ATTORNEY

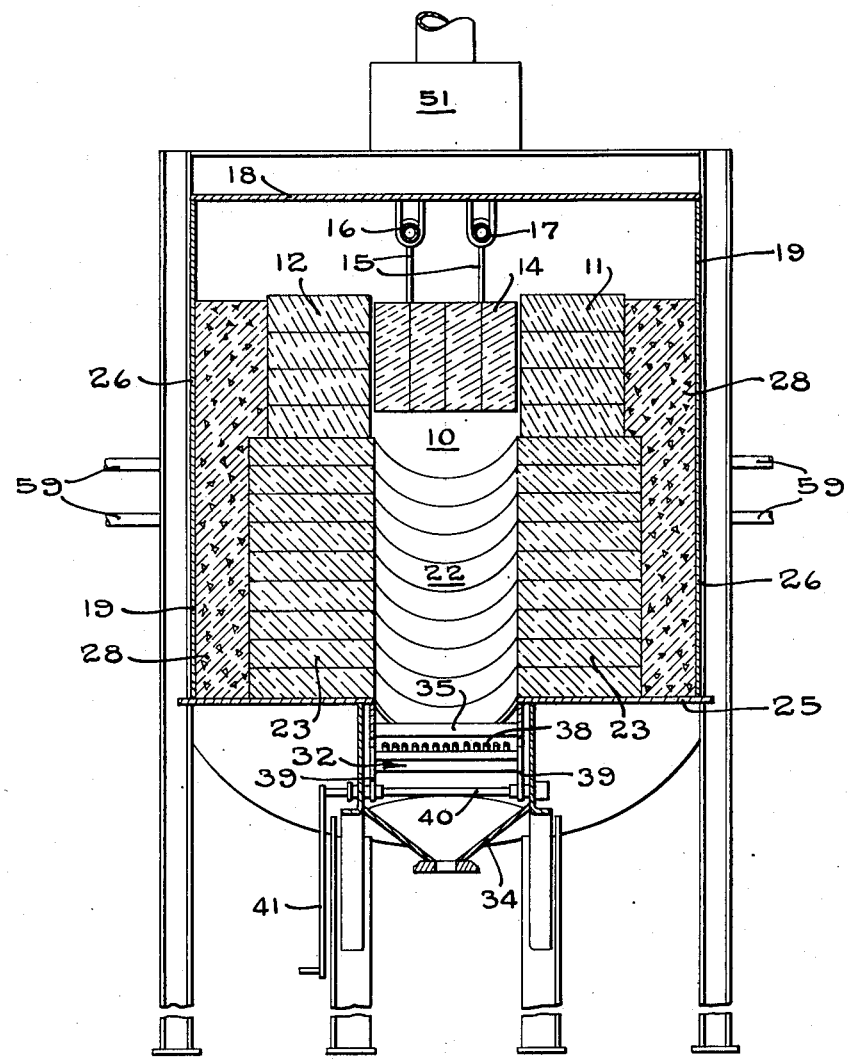
FIG_3

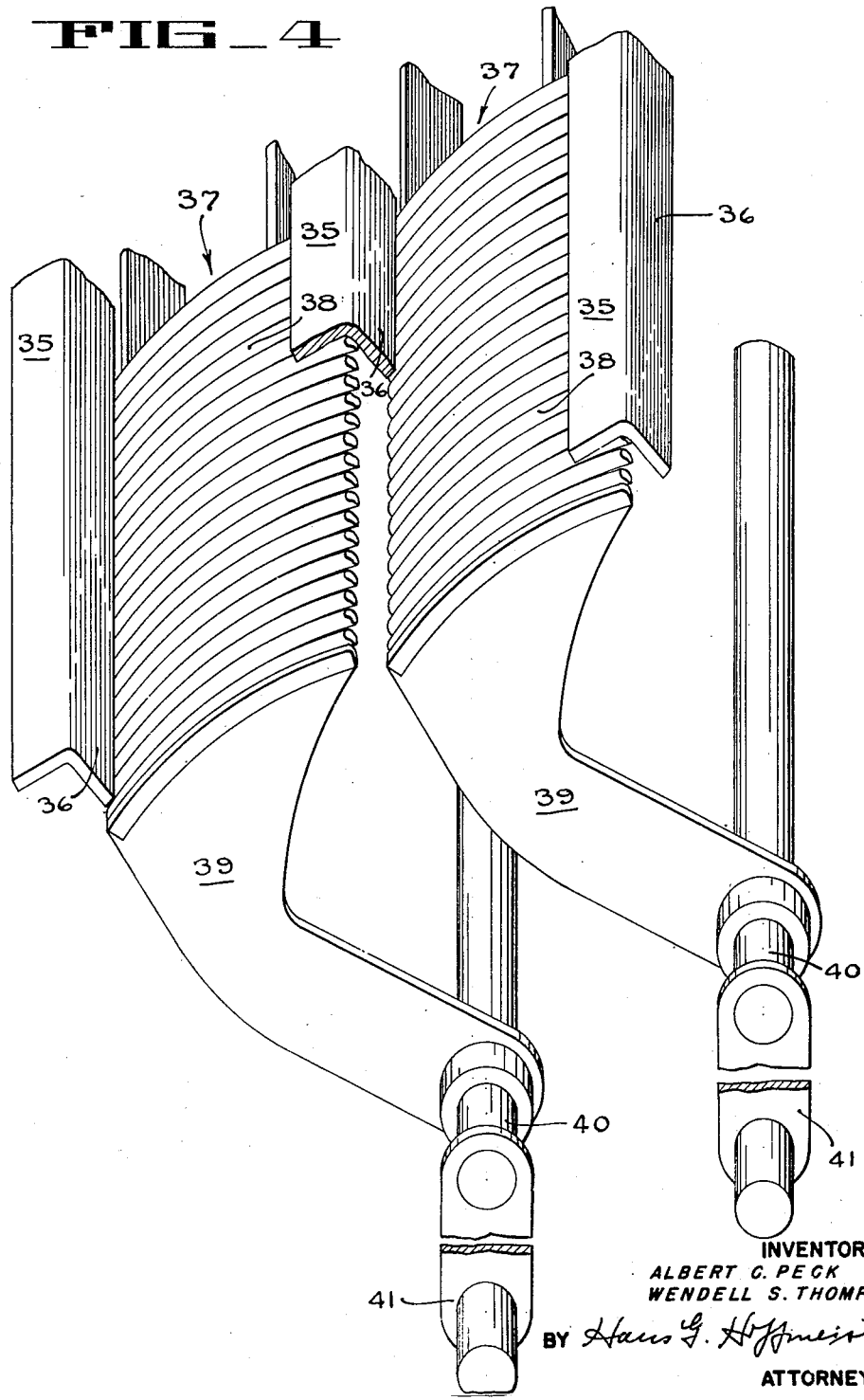

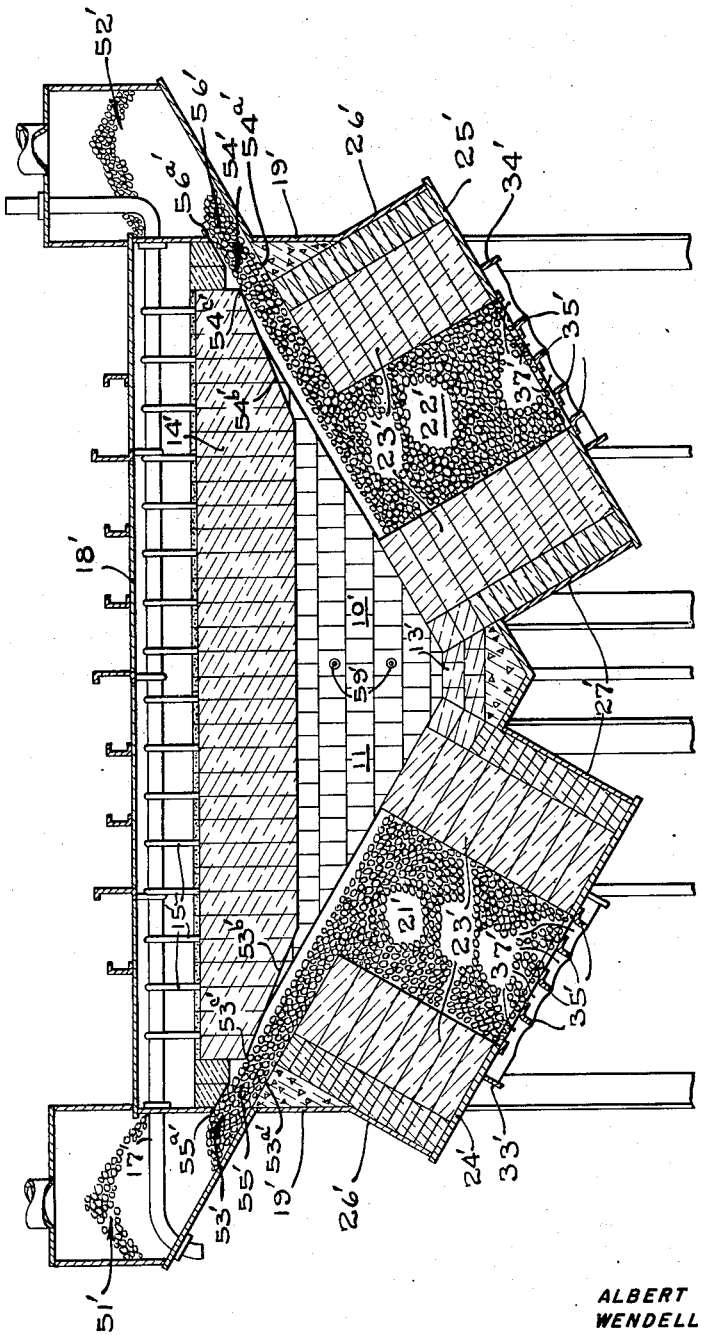

2,612,364

UNITED STATES PATENT OFFICE 2,612,364

REGENERATIVE FURNACE OF THE PEBBLE BED TYPE

Albert C. Peck and Wendell S. Thompson, Los Gatos, Calif., assignors to Food Machinery and Chemical Corporation, San Jose, Calif., a corporation of Delaware Application January 28, 1949, Serial No. 73,344

13 Claims. (Cl. 263—19)

The present invention relates to regenerative furnaces of the pebble bed type. In such furnaces heat exchanging pebble beds disposed at opposite sides of the combustion zone control entrance to and exit from said combustion zone, and the direction in which the furnace is operated is periodically reversed so that said pebble beds are alternately traversed by the cool air supply or the hot combustion gases. Thus, the heat of the exiting combustion gases is continually returned to the entrant air supply so that heat losses are kept at a minimum, and materially higher temperatures may be developed in the combustion zone than ordinarily attainable.

Unfortunately, regenerative furnaces of the pebble bed type cannot be efficiently operated at high temperatures over extended periods of time, due to the tendency of the pebble beds to deteriorate in practical operation. The tortuous channels formed between the pebbles to promote heat exchange between the passing gases and the pebble beds clog or shrink in width so that pressures of increasing magnitude are required to force the air supply through the beds, and eventually the air pressure may force a direct corridor through one or both of the beds enabling the air to shunt the heat-exchange promoting channels. As a result thereof, the regenerative effect of the furnace construction is greatly impaired, and the temperature developed in the combustion zone may decrease and thus render the furnace unable to perform the task for which it was originally intended.

The causes for the described deterioration of the pebble beds vary depending upon the materials from which the pebbles are made and the temperatures to which they are exposed. Certain refractory materials, such as zirconium oxide, tend to disintegrate when subjected to temperature fluctuations and the resultant fragments fill and clog the channels of the pebble beds; also, impurities introduced with the air supply or developed in the combustion zone may collect in the tortuous channels and ultimately render them impassable, or the pebbles may soften and sinter into practically impervious masses; and at very high operating temperatures, such as those used in the fixation of atmospheric nitrogen, the pebbles near the combustion zone, even if made of refractories of the highest quality, may evaporate and part of the evaporated refractories will condense on the surfaces of more remotely positioned pebbles and form crystal deposits which knit adjacent pebbles together and thus restrict the interstitial passages of the beds.

Most of the described phenomena occur to a greater degree as the temperatures in the furnace increase. Hence, while regenerative furnaces of the pebble bed type when made from refractories of the highest quality are of particular advantage in maintaining gas reactions which require very high temperatures, due to their ability to establish and maintain very high temperatures with a minimum expenditure in fuel, it is unprofitable to operate them at the maximum temperatures which their roof and wall structures will stand, since, at these temperatures, the pebble beds will deteriorate within a relatively short time, and thus largely eliminate the advantages of pebble bed regeneration; on the other hand, if such furnaces were operated at materially lower temperatures than the endurance limit of their refractory wall and roof structures in order to extend the life time of the pebble beds, this would frequently result in a considerable loss in the productivity of the process maintained in the furnace.

It is an object of the present invention to provide a regenerative furnace of the pebble bed type that may be operated at peak efficiency over extended periods of time.

It is another object of the present invention to provide a regenerative furnace, of the type referred to, that may effectively be operated over extended periods of time at temperatures near the endurance limit of the refractory wall and roof structures thereof, without breakdowns due to deterioration of the pebble beds.

It is still another object of this invention to provide a regenerative furnace, of the pebble bed type, wherein the pebble beds impose no lower limit as to operating temperature than its roof and wall structures.

Additionally, it is an object of the present invention to provide a regenerative furnace, of the pebble bed type, including means for continually rejuvenating its pebble beds.

It is yet another object of the present invention to provide means for preventing harmful deterioration of the pebble beds in regenerative furnaces, no matter what the cause for such deterioration may be.

Furthermore, it is an object of this invention to provide a pebble bed, for regenerative furnaces, which is adapted to remain in operative condition over extended periods of operation of said furnace.

Moreover, it is an object of the present invention to provide a regenerative furnace, of the pebble bed type, including means adapted to permit gradual replacement of the pebbles of its beds and automatically effective to maintain the depth and surface contour of said beds.

In addition, it is an object of our invention to so arrange the pebble beds in a regenerative furnace of the type referred to, that removal of fouled pebbles from the bottom of said beds is automatically effective to cause delivery of corresponding quantities of clean pebbles onto the top of said beds.

Furthermore, it is an object of the present invention to so arrange the pebble beds in regenerative furnaces, of the type referred to, that the flow paths of the entrant combustion air and the effluent combustion gases through said beds are of substantially uniform length at all points of said beds.

It is yet another object of this invention to so arrange a regenerative furnace employing pebble beds and including means automatically effective upon removal of fouled pebbles from the bottom of said beds to appropriately replenish said beds with clean pebbles, that said clean pebbles move into position in properly preheated condition.

These and other objects of our invention will be apparent from the following description of the accompanying drawings which illustrate certain preferred embodiments thereof and wherein:

Fig. 1 is a vertical longitudinal section through a regenerative pebble bed furnace constructed in accordance with our invention.

Fig. 2 is a plan view of a section through the furnace illustrated in Fig. 1 taken along the lines 2—2 thereof.

Fig. 3 is a cross section of the same furnace, taken along line 3—3 of Fig. 1 and viewed in the direction of the arrows associated with said line, with the pebbles omitted.

Fig. 4 is a projection illustrating part of the grate mechanism employed in the furnace shown in Figs. 1, 2, and 3.

Fig. 5 is a vertical section, similar to Fig. 1 of a modified embodiment of our invention.

In accordance with our invention, means are provided at the bottom of each pebble bed to permit removal of selected quantities of pebbles, and the upper surface of the pebble bed is formed by permitting pebbles to flow into said bed from an elevated pebble reservoir on a slide slanting substantially at the angle of repose of said pebbles, the depth of said pebble flow, and, hence, the upper pebble surface within the bed being determined by a flow restricting gate disposed a selected distance above said slide. Thus, whenever pebbles are removed from the bottom of the bed and the remaining pebbles in the bed sink to lower levels, space is made at the upper end of said bed for fresh pebbles to flow down the slide and into the bed until the upper surface of the pebble bed reaches again the level determined by said gate.

The furnace construction of our invention comprises a combustion chamber 10 of predominantly horizontal compass (Fig. 1) formed between parallel walls 11 and 12 (Fig. 2) that are composed of bricks or blocks of refractory material, such as dense magnesium oxide or stabilized zirconium oxide. Said combustion chamber 10 has a floor 13 of refractory bricks and is covered by a roof 14 composed of rows of similar bricks which are suspended by means of hooks 15 from a pair of horizontal beams 16 and 17 of preferably tubular construction to permit circulation of a cooling fluid therein (Fig. 3). Said beams 16, 17 are supported from the ceiling 18 of a steel jacket 19 which completely encases the refractory furnace structure, as shown in Figs. 1, 2, and 3.

At its opposite ends the combustion chamber 10 communicates with the outside through a pair of vertically descending antechambers 21 and 22 which may be of cylindrical shape and which are filled with pebbles to form regenerative pebble beds. Said pebbles are made from a refractory material and may be spherical, spherodial, or cylindrical in shape; they may vary in size, depending upon the purpose for which the furnace is intended; and in the case of furnaces for the thermal fixation of nitrogen range preferably from ¼" to 1" in diameter. The pebble chambers 21, 22 may be formed by vertically superposed layers 23 of refractory bricks (Fig. 3) that slant toward the center of the furnace at substantially the angle of repose of the pebbles (Fig. 1) and rest upon equally slanting base plates 24 and 25, respectively, which form the bottom of the previously mentioned steel jacket 19 and which, in turn, are supported at a suitable altitude above ground by a number of standards or girders, as shown. The side walls 26 and 27 of said jacket 19 are spaced from the outer surfaces of the refractory furnace structure in a horizontal direction, as shown in Figs. 1, 2, and 3, to accommodate a packing of insulating material 28, such as periclase.

At their lower ends the chambers 21 and 22 are provided with dumping grates 31 and 32 which are encased in hoppers 33 and 34, respectively, that are supported from the base plates 24 and 25 of the steel jacket 19, as shown in Figs. 1 and 3. The grate mechanisms 31, 32 each comprise a plurality of parallel bars 35 extending across the open bottom ends of the chambers 21 or 22, respectively, in a direction transversely to the slopes thereof and are sufficiently spaced from one another to pass pebbles of the sizes specified above. The upper edges of said bars are provided with depending lips or flanges 36, as shown in Figs. 1 and 4, and the slots 37 formed between said lips 36 and the lower edges of adjacently higher ones of said bars 35 are ordinarily blocked by narrow arcuate grills 38 (Figs. 3 and 4). Each of said grills is supported between pairs of lever arms 39 that are firmly mounted on a transverse operating shaft 40 which is provided with an exteriorly positioned manipulating crank 41. Said grills 38 are of a construction to permit air or combustion gases to pass freely into and out of the furnace, but the individual bars of said grills are positioned sufficiently close together to block the pebbles flowing from the chambers 21, 22 through the slots 37. To remove pebbles from the chambers 21 or 22, the cranks 41 are operated to withdraw the grills 38 from underneath their slots 37 and thus permit the pebbles to flow freely through said slots into the hoppers which envelope the described grate mechanisms. In Fig. 1, the lowermost grill 38 of the grate mechanism 31 provided underneath the left of the pebble beds is shown in such an "open" position. The hoppers 33 and 34 are each provided with slide gates 43 and 44, respectively, which may be operated to discharge the dumped pebbles through suitable air locks 45 and 46 into a reconditioning system (not shown).

In accordance with our inveniton, means are provided which automatically restore the pebble beds to their proper level whenever pebbles are removed from the bottom of the chambers 21 and 22. For this purpose, each of the pebble beds is associated with a pebble reservoir provided exteriorly of the furnace structure at a suitably higher level than the upper end of its respective pebble bed. In the exemplary embodiment of the invention illustrated in the accompanying drawings, these pebble reservoirs have the shape of hoppers 51 and 52 formed by extensions of the jacket 19 at opposite ends of the furnace structure, as best shown in Fig. 1. Said hoppers communicate with their respective pebble chambers 21, 22 through feed chutes in the form of channels 53 and 54, respectively, which slope at substantially the angle of repose of the pebbles employed in the furnace. Said chutes or channels are preferably of the same width as the pebble bed chambers 21, 22, as may be seen from Fig. 2. They commence with the slanting floors 51a, 52a of the hoppers 51, 52 pass through slots 55, 56 in the side wall 26 of the steel jacket 19, penetrate through the insulating packing 28 and are cut into the uppermost brick layers 23 of the bed chambers 21, 22 and the end bricks of the roof structure 14, respectively. It should be noted from Fig. 1 that while the floors 53a, 54a of the channels 53, 54 slant over their total length at substantially the angle of repose of the pebbles—which is approximately an angle of 33° for pebbles of the shape and size described hereinbefore—the ceilings 53b, 54b of said channels as formed by the cut-away end bricks of the roof structure 14 slant at an angle of only about 25° so that the open vertical width of the channels 53, 54 increases progressively in the direction of the combustion zone.

Whenever pebbles are poured into the hoppers 51 or 52, the forces of gravity cause them to flow down the inclined surfaces 53a or 54a into their respective bed chambers until the growing pebble slopes accumulating in said chambers rise above the level of said inclined surfaces and reach the level of the ceilings 53b, 54b at their lowest points relative to said inclined surfaces. In the particular embodiment of the invention illustrated in the accompanying drawings said lowest points are formed by the outer bottom edges 53c and 54c of the left or right hand end bricks of the roof structure 14. When the rising pebble slopes reach said edges in a straight plane slanting at the angle of repose, further flow of pebbles through the gates formed between said edges 53c, 54c and the inclined surfaces 53a, 54a, respectively, is backed up and the slopes will rise no further no matter how large the supply of pebbles in the hoppers may be. On the other hand, whenever pebbles are withdrawn at the bottom of the chambers 21, 22 and any part of the upper surface of the pebble beds, as established by the control corners 53c, 54c, caves in, the pebbles on the inclined surfaces 53a or 54a will immediately slide into any depressions of the pebble bed surfaces and free the control gates 53a/c or 54a/c to pass the necessary supply of pebbles from the hoppers 51, 52 that will re-establish the same uninterrupted surface line from the control edges 53c or 54c to the inner walls of the chambers 21, 22. Hence, as long as there is an adequate supply of pebbles in the reservoirs 51, 52, the upper surface of the pebble beds formed in the chambers 21 and 22 coincides at all times with an inclined plane comprising the control edge 53c or 54c and slanting away from said control edge toward the center of the furnace at the natural angle of repose of the pebbles employed.

In practical operation fuel is supplied to the combustion zone through suitable nozzles indicated at 59 in Fig. 1, and air is alternately delivered to the combustion zone 10 through one or the other of the pebble beds 21, 22. For instance, if at a particular moment in the operation of the furnace the pebble bed 21 is hot, while the pebble bed 22 is relatively cool, a blast of air from a blower (not shown) is directed through a conduit 61 into the hopper 33 and enters the pebble bed 21 through the grills 38 and the slots 37 of the grate mechanism 31. As the air travels through the tortuous channels formed by the pebble bed 21, it rapidly absorbs heat from the pebbles and arrives at the combustion zone in a heated condition. The reaction gases formed in the combustion zone 10 traverse the cool pebble bed 22 where they are rapidly chilled, and pass through the slots 37 and the grills 38 of the grate mechanism 32 into the hopper 34 from where a conduit 62 may conduct them to a further processing station (not shown) which in case of a process for the thermal fixation of nitrogen would be a nitrogen-oxide recovery system. After an interval of time proportioned to prevent an undue rise in the temperature of the gases discharging from the bottom of the pebble bed 22, the operation of the furnace is reversed by manipulating a suitable reversing valve (not shown) to direct the supply of air through the conduit 62, instead of conduit 61, so that it may now be preheated in the freshly heated pebble bed 22 while the reaction gases are discharged through the pebble bed 21 and the conduit 61. As the process is continued in this manner by periodic reversals in the direction of operation of the furnace, portions of the pebbles in the two pebble beds 21, 22 are replaced to maintain said pebble beds in proper operating condition. For this purpose, the grate mechanisms 31 or 32 are operated to dump limited quantities of pebbles from the bottom of the beds into the hoppers 33 or 34. While all the grills 38 of either the left or the right grate mechanism may simultaneously be with withdrawn from their respective slots 37 at periodic intervals, it is particularly advantageous to operate the individual grills 38 in continuous succession so that pebbles are continually withdrawn from the pebble beds. As soon as pebbles discharge from the bottom of a bed, the pebbles remaining in the bed chamber sink to lower levels causing the upper surface of the bed to be depressed and/or form a steeper angle than the angle of repose of the pebbles. As a result thereof, the pebbles in the feed chute 53 or 54 follow the forces of gravity and slide into the sinking bed permitting new pebbles to enter from the reservoir 51 or 52 through the grate 53a/c or 54a/c until the same conditions are re-established interiorly of the furnace that existed before the dumping grate was operated. Hence, whenever pebbles are withdrawn at the bottom of a pebble bed, the bed is automatically replenished to its former level as long as its associated hopper contains an adequate supply of pebbles, and there is no need for visual control means, such as peep holes through which the condition of the pebble bed may have to be checked, or for weighing the discharged pebbles in order to deliver an equal weight of pebbles through the hopper onto the upper surface of the tapped pebble bed. Furthermore, the pebble replacements are not abruptly subjected to the intense heat of the furnace but are gradually preheated as they slide intermittently down the inclined surfaces 53a or 54a with every replacement operation. Due to the fact that the ceilings 53b, 54b of the supply channels 53, 54 recede gradually from the floors thereof in the direction of the combustion zone, as shown in Fig. 1, the stream of pebbles descending the floor of said supply channels is progressively exposed to greater amounts of heat emitted from the combustion zone. Hence, the refractory pebbles are not exposed to heat shock which would cause them to crack or disintegrate into small fragments. Additionally, due to the fact that the grates 31 and 32 are arranged to extend parallel to the slanting upper surfaces of their respective pebble beds, the flow paths of the entrant combustion air and the effluent reaction gases through said beds are of substantially uniform length and the described pebble replenishing arrangement is automatically effective to maintain them at said length during the operation of the furnace, whether pebbles are withdrawn from the bottom of the beds or shrink under the influence of the intense heat developed in the reaction zone.

To safeguard against the possibility that one or the other of the control corners 53c or 54c may break off during the operation of the furnace and cause the antechambers 21 or 22 to be flooded with pebbles from the reservoirs, we provide secondary control gates in the upper edges of the slots 55, 56 in the steel jacket 19 through which the pebble reservoirs 51, 52 communicate with the interior of the furnace. Said slots are made sufficiently low for said upper edges 55a, 56a to set the upper surfaces of the pebble beds at only slightly higher levels whenever such an emergency should arise.

Thus, the pebbles in the beds 21, 22 may all be gradually replaced without appreciably disturbing the shape or level of the upper pebble bed surfaces by simply manipulating the dumping grates 31, 32 continually or at predetermined intervals, and the beds may thus be kept in a continuous process of rejuvenation. The rate at which the pebbles should be made to pass through the chambers 21, 22 depends upon the material from which said pebbles are made and upon the temperatures at which the particular furnace is operated. Said rate may readily be adjusted to keep deterioration of the pebble bed regenerators within permissible limits whether it is caused by crystal growth, sintering, spalling, or any other form of contamination. Thus, when a furnace constructed in accordance with our invention and equipped with pebble beds filled with pebbles of dense magnesium oxide to a depth of about four feet was employed in the manufacture of nitrogen oxides from atmospheric air, it was found sufficient to actuate its dumping grates every 30 minutes in such a manner that the beds were completely replaced after every 48 hours of operation.

Fig. 5 illustrates a modified embodiment of our invention which agrees in all essentials with the embodiment illustrated in Figs. 1, 2, and 3 except that its bed chambers 21', 22' extend in a direction perpendicular to the angle of repose of the pebbles employed. A construction of this type has the advantage that the pebble beds are at all points of equal depth in the direction in which they are traversed by the air supply or the reaction gases so that the lengths of all the flow paths through said pebble beds are practically identical. In addition, the superposed brick layers 23' from which the chambers 21', 22' are composed may be constructed from bricks of identical size and design so that the furnace of Fig. 5 is simpler to build, and involves less cost, than the furnace illustrated in Fig. 1.

While we have described our invention with the aid of certain perferred embodiments thereof, it will be understood that we do not wish to be limited to the constructional details of the furnaces shown and described which may be departed from without departing from the scope or spirit of our invention. Thus, the grate mechanism illustrated and described is purely exemplary and any other suitable dumping grate may readily be used instead. Furthermore, the pebble chambers may be of angular rather than rounded cross-sectional contour, and while we prefer to provide the pebble replenishing chutes 53, 54 at diametrically opposite points of the furnace construction so that the inclined upper surfaces of the pebble beds may face the combustion zone, said chutes may also be arranged to lead into the pebble bed chambers at some lateral points. Moreover, while said pebble replenishing chutes are most effective to provide a smooth upper pebble bed surface when made of a width equal to the diameter of the pebble bed chambers, useful results will also be obtained with chutes of larger or smaller width. Furthermore, while in explaining the construction and operation of our novel furnace the thermal process for the fixation of atmospheric nitrogen has repeatedly been mentioned to demonstrate its particular advantages, said furnace will be of great utility in processes other than said nitrogen fixation process.

Having thus described our invention and the manner in which it is performed, what we claim is:

1. A regenerative furnace having a plurality of pebble beds, a combustion chamber disposed intermediately of the upper ends of, and accessible through, said pebble beds, a pebble reservoir disposed above each of said pebble beds exteriorly of the circumference thereof at a point remote from said combustion chamber, supply channels descending from said reservoirs to the upper ends of their respective pebble beds at substantially the angle of repose of the pebbles employed, and means provided at the lower ends of each of said beds to remove selected quantities of pebbles therefrom.

2. A regenerative furnace having a plurality of pebble beds, a combustion chamber disposed intermediately of the upper ends of and accessible through said pebble beds, a pebble reservoir disposed above each of said pebble beds exteriorly of the circumference thereof at points remote from said combustion chamber, slides sloping from said reservoirs to the upper ends of their respective pebble beds, gate means disposed above said slides to limit the depth of the pebble stream descending said slides, and means provided at the lower ends of each of said beds to remove selected quantities of the pebbles therefrom.

3. A regenerative furnace comprising a pair of antechambers adapted to accommodate a quantity of refractory pebbles, a combustion chamber disposed intermediately of the upper ends of said antechambers, grate means provided at the lower ends of said antechambers and adapted, upon actuation, to dump selected amounts of the pebbles contained in said antechambers, pebble reservoirs disposed above the upper ends of said antechambers at points remote from said combustion chamber, and feed channels leading from said reservoirs to the peripheries of said antechambers and having floors sloping at substantially the angle of repose of the pebbles employed, said channels being arranged to increase in height in the direction of said combustion chamber to expose the descending stream of pebbles progressively to greater amounts of the heat emitted from said combustion chamber during operation of said furnace.

4. A regenerative furnace comprising a pair of antechambers adapted to accommodate a quantity of refractory pebbles, a combustion chamber disposed intermediately of the upper ends of said antechambers, grate means provided at the lower ends of said antechambers and adapted, upon actuation, to dump selected amounts of the pebbles contained in said antechambers, pebble reservoirs disposed above the upper ends of said antechambers at points remote from said combustion chamber, and feed channels leading from said reservoirs to the peripheries of said antechambers at substantially the angle of repose of the pebbles employed, said channels having the same width as their respective antechambers.

5. A regenerative furnace comprising a combustion chamber, a number of air supply passages ascending to said combustion chamber and adapted to accommodate a quantity of refractory pebbles, grate means disposed at the lower ends of said passages and adapted, upon actuation, to dump selected amounts of the pebbles contained in said passages, pebble reservoirs disposed above said passages at levels higher than said combustion chamber, and supply channels leading from said reservoirs to the upper ends of said passages and having floors slanting substantially at the angle of repose of said pebbles, the ceilings of said channels being arranged to form gates determining the depth of the pebble stream descending along the floors of said channels and hence the upper levels of the pebble beds accumulating in said passages.

6. Arrangements according to claim 5 wherein said ceilings are arranged to form a sequence of gates of type characterized.

7. Arrangement according to claim 5 wherein said ceilings are arranged to form a sequence of gates of the type characterized setting slightly differing upper levels for said pebble beds.

8. A regenerative furnace comprising a pair of substantially vertically ascending antechambers adapted to accommodate a quantity of pebbles of refractory material, a combustion chamber disposed intermediately of and communicating with the upper ends of said antechambers, grate means provided at the lower ends of said antechambers and adapted, upon actuation, to dump selected amounts of said pebbles, pebble reservoirs disposed above the upper ends of said antechambers at points remote from said combustion chamber, and feed channels leading from said reservoirs to the upper ends of said antechambers and having floors sloping at substantially the angle of repose of the pebbles employed, said grate means being arranged to extend in planes parallel to the floors of said channels.

9. A regenerative furnace comprising a combustion chamber, a pair of antechambers disposed at opposite sides of said combustion chamber with their upper ends opening directly into said combustion chamber, pebble reservoirs disposed above said antechambers at points remote from said combustion chamber, feed chutes slanting from said reservoirs to the upper ends of said antechambers at substantially the angle of repose of the pebbles employed, and control means disposed above said chutes and adapted to limit the depth of the pebble streams descending said chutes, said antechambers being of a compass perpendicular to the slanting planes of their respective feed chutes.

10. A regenerative furnace comprising a pair of substantially vertically ascending antechambers adapted containing a heap of pebbles of refractory material, a combustion chamber disposed intermediately of, and in open communication with, the upper ends of said antechambers, grate means provided at the lower ends of said antechambers and adapted upon actuation to dump selected amounts of the pebbles contained in said chambers, pebble reservoirs disposed above the upper ends of said antechambers, and feed conduits leading from said reservoirs to the upper ends of said antechambers at peripheral points thereof remote from said combustion chamber, to re-establish the level of the heap of pebbles in said chamber whenever said grate means is actuated.

11. A regenerative furnace comprising a plurality of antechambers containing refractory pebbles, a combustion chamber disposed intermediately of and in direct communication with the upper ends of said antechambers, grate means provided at the lower ends of said antechambers and adapted upon actuation to dump selected amounts of the pebbles contained in said antechambers, pebble reservoirs disposed above the upper ends of said antechambers at points remote from said combustion chamber, and feed conduits slanting from said reservoirs to the peripheries of their respective antechambers, said conduits being arranged to increase in vertical depth above the flow of pebbles in the direction of said combustion chamber to expose the descending streams of pebbles progressively to greater amounts of the heat emitted from said combustion chamber during operation of the furnace.

12. A regenerative furnace comprising a combustion chamber, antechambers adapted to contain refractory pebbles and arranged at opposite sides of said combustion chamber with their upper ends opening directly into said combustion chamber, pebble containing reservoirs located at a higher level than the upper ends of said antechambers and having discharge openings adapted to deliver pebbles from peripheral points of said antechambers laterally into the same, grate means provided at the lower ends of said antechambers and operable to pass pebbles from said antechambers, and beds of refractory pebbles having upper surfaces slanting toward the combustion chamber at the angle of repose piled up upon said grate means within said antechambers to such an altitude that the angle of repose blocks the flow of pebbles from said reservoirs into said antechambers, whereby upon delivery of an adequate supply of pebbles into said reservoirs the pebble beds formed in said antechambers have self-re-establishing upper surfaces forming lateral boundaries of said combustion chambers.

13. A regenerative furnace comprising a combustion chamber, antechambers adapted to contain refractory pebbles and arranged at opposite sides of said combustion chamber with their upper ends opening directly into said combustion chamber, pebble containing reservoirs located at a higher level than the upper ends of said antechambers, feed conduits slanting from said reservoirs to peripheral points of said antechambers remote from said combustion chamber, grate means provided at the lower ends of said antechambers and operable to pass pebbles from said antechambers, and beds of refractory pebbles having upper surfaces slanting toward the combustion chamber at the angle of repose piled up upon said grate means within said antechambers to such an altitude that the angle of repose blocks the flow of pebbles from said reservoirs into said antechambers, whereby upon delivery of an adequate supply of pebbles into said reservoirs the pebble beds formed in said antechambers have self-re-establishing upper surfaces declining toward said combustion chamber and forming lateral boundaries thereof.

ALBERT C. PECK.
WENDELL S. THOMPSON.

REFERENCES CITED

The following references are of record in the file of this patent:

UNITED STATES PATENTS

| Number | Name | Date |
|---|---|---|
| 688,651 | Kirk | Dec. 10, 1901 |
| 1,102,714 | Bornmann | July 7, 1914 |
| 1,627,553 | Fasting | May 10, 1927 |
| 1,737,061 | Ryder | Nov. 26, 1929 |
| 1,871,166 | Fahrbach | Aug. 9, 1932 |
| 1,885,998 | Edholm | Nov. 1, 1932 |
| 2,148,946 | Hubmann et al. | Feb. 28, 1939 |
| 2,399,609 | Wainer | Apr. 30, 1946 |
| 2,420,376 | Johansson | May 13, 1947 |
| 2,443,337 | Weber | June 15, 1948 |
| 2,444,274 | Utterback | June 29, 1948 |
| 2,445,554 | Bergstrom | July 20, 1948 |
| 2,531,725 | Church | Nov. 28, 1950 |

FOREIGN PATENTS

| Number | Country | Date |
|---|---|---|
| 636,892 | Germany | Apr. 28, 1937 |
| 255,159 | Great Britain | July 19, 1926 |